United States Patent
Kunc et al.

(10) Patent No.: US 11,518,073 B2
(45) Date of Patent: Dec. 6, 2022

(54) LONG FIBER INJECTION MOLDING

(71) Applicant: UT-Battelle, LLC, Oak Ridge, TN (US)

(72) Inventors: Vlastimil Kunc, Oak Ridge, TN (US); Ahmed A. Hassen, Oak Ridge, TN (US); John M. Lindahl, Oak Ridge, TN (US); Seokpum Kim, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 131 days.

(21) Appl. No.: 16/953,425

(22) Filed: Nov. 20, 2020

(65) Prior Publication Data

US 2021/0154896 A1 May 27, 2021

Related U.S. Application Data

(60) Provisional application No. 62/938,550, filed on Nov. 21, 2019.

(51) Int. Cl.
| | | |
|---|---|---|
| *B29C 45/00* | (2006.01) | |
| *B29C 45/54* | (2006.01) | |
| *B29K 309/08* | (2006.01) | |
| *B29K 105/12* | (2006.01) | |
| *B29K 77/00* | (2006.01) | |

(52) U.S. Cl.
CPC ...... *B29C 45/0005* (2013.01); *B29C 45/0001* (2013.01); *B29C 45/54* (2013.01); *B29K 2077/00* (2013.01); *B29K 2105/12* (2013.01); *B29K 2309/08* (2013.01)

(58) Field of Classification Search
CPC .............. B29C 70/021; B29C 48/2886; B29C 45/14786; B29C 70/16; B29C 70/081; B29C 70/06; B29C 66/72143; B29C 66/72141; B29C 66/7214; B29C 66/7212; B29C 66/721; B29C 65/5014; B29C 65/488; B29C 2045/1723; B29C 2045/0008; B29C 2045/0006; B29C 45/547; B29C 45/544; B29C 45/54; B29C 45/0001; B29C 45/0005
See application file for complete search history.

(56) References Cited

U.S. PATENT DOCUMENTS 10,011,048 B1 * 7/2018 Johnston, VII ........... B29B 7/60

* cited by examiner

*Primary Examiner* — Stella K Yi
(74) *Attorney, Agent, or Firm* — Warner Norcross + Judd LLP

(57) ABSTRACT

An improved method for obtaining high fiber volume fraction, long fiber injection molded articles is provided. According to one embodiment, the method includes forming an injection molding feedstock by cutting pre-impregnated fiber-reinforced tape into platelets. The platelets can be coated with a thin layer of polymer to allow sliding of the platelets with respect to each other at the early stages of plastication, rather than forcing relative motion of fibers with respect to each other. The method can further include the dispersion of material only in the final stages of the injection molding screw to promote gentle motion of the feedstock at the earlier stages of the plastication process. The method allows improvement of mechanical properties of articles manufactured with equipment and techniques that are prevalent in high volume automotive and consumer industries.

17 Claims, 3 Drawing Sheets

US 11,518,073 B2

LONG FIBER INJECTION MOLDING

CROSS-REFERENCE TO RELATED APPLICATIONS

This application claims the benefit of U.S. Provisional Application 62/938,550, filed Nov. 21, 2019, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to long fiber injection molding of articles for high volume automotive and consumer industries.

BACKGROUND OF THE INVENTION

Injection molding is a widespread manufacturing technique for the production of both un-reinforced and reinforced plastics. Reinforced plastics typically contain short fibers, as the processing of long fibers is difficult and results in significant fiber length attrition. To achieve reinforced plastics having a high strength and stiffness, pultruded pellets are currently used as the feedstock. These pellets are made by impregnating a fiber tow with a polymer and cutting the pellets with a desired length in an approximate shape of a cylinder, typically 3 mm in diameter and 12 mm in length. The pellets are then fed into an injection molding machine, where a screw rotates at constant speed in a heated barrel. The screw typically has three sections—feed, transition, and metering—that allow efficient plastication of material via shear and the external application of heat. The feed section serves primarily for conveying solid pellets and is responsible for approximately 50% of fiber breakage in the process, as the long solid pellets are broken up into smaller pieces while be conveyed and compressed in a small space.

Accordingly, there remains a continued need for long fiber injection molding systems, and in particular, a method that leverages the advantages of fiber-reinforced feedstocks for a wide variety of injection molding applications.

SUMMARY OF THE INVENTION

An improved method for obtaining high fiber volume fraction, long fiber injection molded articles is provided. The method includes forming an injection molding feedstock by cutting pre-impregnated fiber-reinforced tape into platelets. The platelets can be coated with a thin layer of polymer to allow sliding of the platelets with respect to each other at the early stages of plastication, rather than forcing relative motion of fibers with respect to each other. The method can further include the dispersion of material only in the final stages of an injection molding screw to promote gentle motion of the feedstock at the earlier stages of the plastication process. The method allows improvement of mechanical properties of articles manufactured with equipment and techniques that are prevalent in high volume automotive and consumer industries.

These and other features of the invention will be more fully understood and appreciated by reference to the description of the embodiments and the drawings.

DETAILED DESCRIPTION OF THE CURRENT EMBODIMENT

As discussed herein, the current embodiments generally relate to a method of injection molding fiber-reinforced articles using platelet feedstock. The method generally includes: (a) providing a platelet feedstock, (b) the supplying the platelet feedstock into an injection molding machine, (c) rotating the screw and heating the feedstock within a plasticizing cylinder, and (d) discharging the molten resin from a nozzle opening into a mold. Each such operation is separately discussed below.

Figure 1:
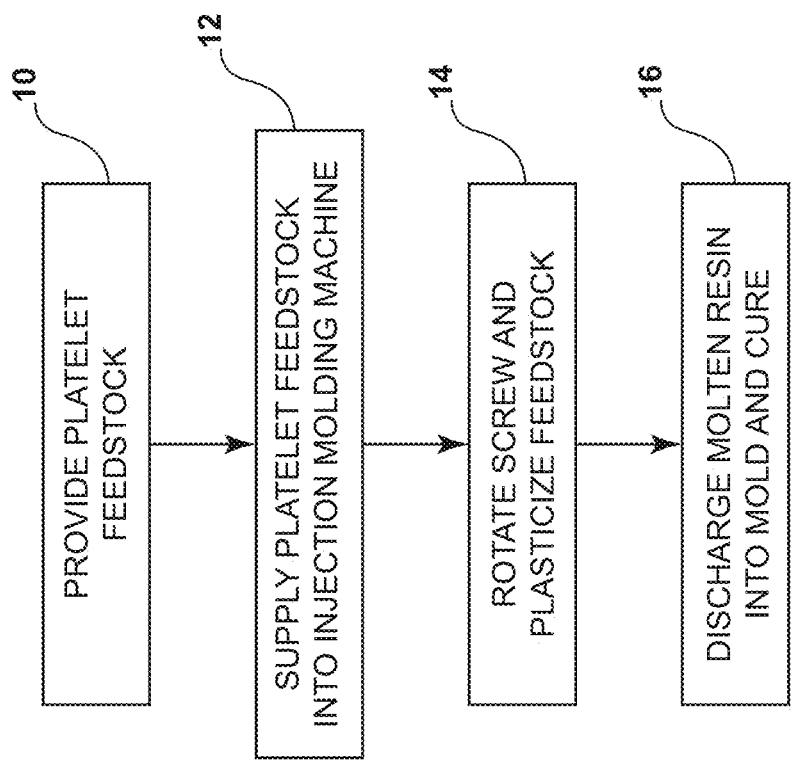
FIG. 1 is a flow chart illustrating a method of injection molding fiber-reinforced articles using platelet feedstock.

Providing a platelet feedstock is illustrated as step 10 in FIG. 1 and generally includes providing a plurality of platelets containing fiber strands within a thermoplastic or thermosetting resin. The fiber strands can include, for example, fiber strands of carbon, aramid, glass, silicon carbide, or graphite. The thermoplastic or thermosetting matrix (for example polyamide) can be partially cured, such that the fiber-reinforced tape is a prepreg tape. This step includes separating a prepreg tape into the plurality of platelets. The fibers within the prepreg tape include continuous unidirectional fibers. In other embodiments, the fibers within the prepreg tape include multi-dimensional fibers (two or three-dimensional fibers), non-woven fibers, woven fibers, and chopped random fibers. The prepreg tape can be cut width-wise and length-wise such that the platelets achieve a desired shape. For example, the prepreg tape can be cut width-wise and length-wise to have a square or rectangular shape with a mean surface area of between 0.005 in$^2$ and 0.5 in$^2$, further optionally about 0.25 inches by 0.25 inches for a surface area of 0.0625 in$^2$. The prepreg tape, and consequently the platelets, can include a thickness of less than 1 mm and can include a polymer coating to promote sliding of the platelets with respect to each other at the earlier stages of the plastication process.

Figure 2:
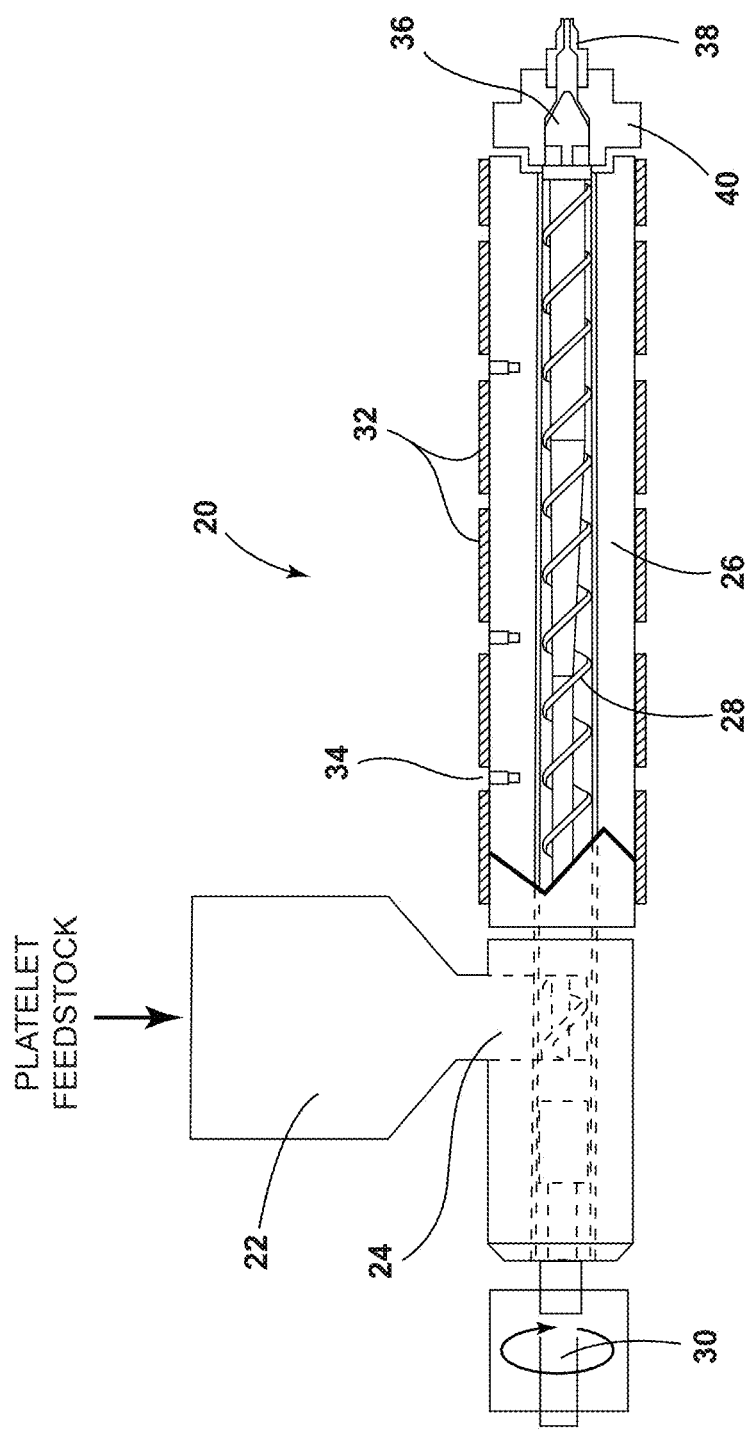
FIG. 2 is a schematic diagram of an injection molding machine for use with the method of the present invention.

Supplying the platelet feedstock into an injection molding machine is illustrated as step 12 in FIG. 1 and includes depositing bulk platelet feedstock into a hopper. An exemplary injection molding machine 20 is illustrated in FIG. 2. The hopper 22 retains the platelet feedstock, which are gravity fed through a gated feed hole 24 into a plasticizing cylinder 26. This step optionally includes metering the amount of feedstock introduced into the plasticizing cylinder 26 (possibly feed starving) to allow processing of high volume fraction molded articles. Within the plasticizing cylinder 26, a screw 28 includes a helical thread which, when rotated, cause the feedstock to progress forward under high pressure by operation of a screw drive 30. Multiple heater bands 32 surround the plasticizing cylinder 26 and heat the feedstock contained therein, as measured by one or more thermocouples 34.

Rotating the screw and heating the feedstock within a plasticizing cylinder is illustrated as step 14 in FIG. 1. As the screw 28 rotates, the feedstock is urged further forward and, together with the heater bands 32, becomes fully plasticized. The polymer coating promote sliding of the platelets during plasticization to preserve the integrity of the fibers contained within the molten resin. In some embodiments, a specialty mixing screw may be used, in which the dispersion of material is achieved only in the final stages of the screw (such as a distributive mixer) to promote gentle motion of the feedstock in earlier stages of the plastication process. Low/negative controlled backpressure can also be used to minimize fiber breakage. The molten resin includes a uniform viscosity and uniform fiber density, such that the finished article will lack any dead spots low in fiber count.

Discharging the molten resin from the nozzle opening into a mold is illustrated as step 16 in FIG. 1. This step generally includes driving the screw 28 forward (in the case of a reciprocating screw) and discharging the molten resin through a non-return valve 36 and nozzle opening 38 in an end cap 40. This process is repeated for subsequent shots of molten resin. The molten resin is then directed to a mold, optionally through one or more hot runners. In its most basic configuration, the mold includes a mold plate and a cavity plate which cooperate to define a mold cavity in the desired shape of a single article (in the case of a single cavity mold) or multiple articles (in the case of a multi-cavity mold). The fiber strands can be present in the molten resin in an amount from 40% to 80% by volume of the molten resin and with an average length of at least 1 mm, e.g., 2 mm.

The present invention is further described below in connection with a laboratory example, which is intended to be non-limiting.

Figure 3:
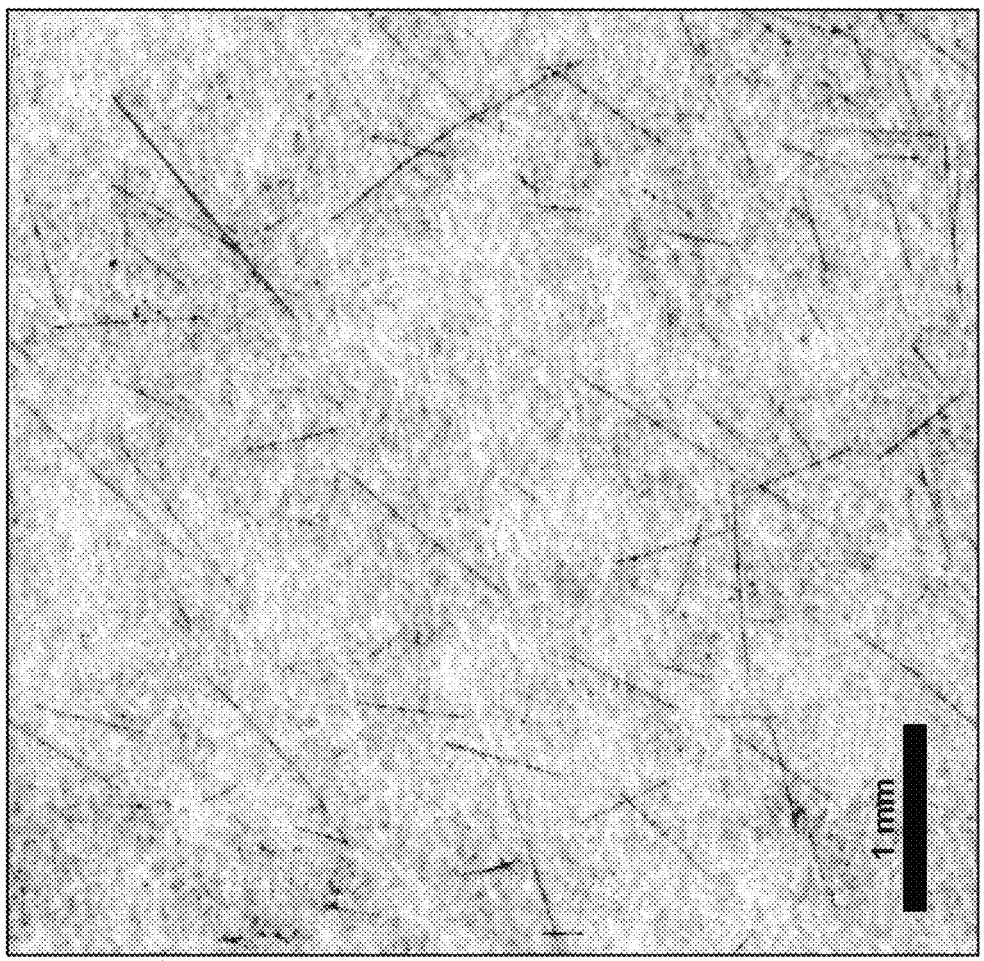
FIG. 3 is an optical image of an injection molded article illustrating fibers with an average fiber length of approximately 2 mm.

Platelets were produced in 0.25 inch by 0.25 inch squares from PA66 carbon fiber tape. The carbon fiber accounted for 58% of the tape weight, indicating very high fiber loading. The platelets were processed through a 1 inch diameter extruder with the following barrel temperature settings (zones 1 through 5): 240° C., 265° C., 270° C., 270° C., 265° C. At 50 rpm, the plasticized resin provided 200 psi of back pressure. As shown in FIG. 3, the fiber articles formed according to this example were determined to have an average fiber length of 1.96 mm at 58% carbon fiber loading.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method for manufacturing an object comprising:
   providing a fiber-reinforced tape containing fiber strands within a thermoplastic or thermosetting matrix;
   applying a polymer coating to at least one surface of the fiber-reinforced tape, the polymer coating being different from the thermoplastic or thermosetting matrix;
   after applying the polymer coating to the at least one surface of the fiber-reinforced tape, forming a feedstock by separating the fiber-reinforced tape into a plurality of platelets, the plurality of platelets containing the fiber strands within the thermoplastic or thermosetting matrix and including the polymer coating;
   supplying the feedstock into an injection molding machine, the injection molding machine including a plasticizing cylinder having a screw and a nozzle having an opening;
   rotating the screw and heating the feedstock within the plasticizing cylinder to convert the feedstock into a fiber-reinforced molten resin, wherein the polymer coating promotes sliding of the plurality of platelets relative to each other during plasticization to thereby preserve the fiber strands contained within the fiber-reinforced molten resin; and
   discharging the fiber-reinforced molten resin from the nozzle opening, wherein the fiber strands are present in the fiber-reinforced molten resin in an amount from 40% to 80% by volume of the fiber-reinforced molten resin and with an average length of at least 1 mm.

2. The method of claim 1, wherein the fiber-reinforced tape includes fiber-reinforced prepreg and wherein the thermoplastic or thermosetting matrix is partially cured.

3. The method of claim 1, wherein the fiber strands include carbon, aramid, glass, silicon carbide, or graphite.

4. The method of claim 1, wherein supplying the feedstock includes metering the amount of feedstock introduced into the plasticizing cylinder.

5. The method of claim 1, including maintaining a pressure within the plasticizing cylinder below a threshold to reduce breakage of the fiber strands contained therein.

6. The method of claim 1, wherein the thermoplastic or thermosetting matrix includes polyamide.

7. The method of claim 1, wherein the plurality of platelets are rectangular platelets having a surface area of between 0.005 in$^2$ and 0.5 in$^2$.

8. The method of claim 7, wherein the plurality of platelets include a mean thickness of less than 1 mm.

9. A method for manufacturing an object comprising:
   providing a fiber-reinforced tape containing unidirectional fiber strands within a resin matrix;
   applying a polymer coating to at least one surface of the fiber-reinforced tape, the polymer coating being different from the resin matrix;
   after applying the polymer coating to the at least one surface of the fiber-reinforced tape, separating the fiber-reinforced tape into a plurality of platelets, the plurality of platelets including the unidirectional fiber strands within the resin matrix and including the polymer coating;

supplying the plurality of platelets into an injection molding machine, the injection molding machine including a plasticizing cylinder having a mixing screw;

rotating the mixing screw and the heating the plurality of platelets within the plasticizing cylinder to convert the plurality of platelets into a molten resin, wherein the polymer coating promotes sliding of the plurality of platelets relative to each other during rotation of the mixing screw to thereby preserve the fiber strands contained within the molten resin; and discharging the molten resin into a mold cavity to form an injection molded article having uniformly dispersed fiber strands with an average length of at least 1 mm.

10. The method of claim 9, wherein the resin matrix comprises a thermoplastic matrix or a thermosetting matrix.

11. The method of claim 10, wherein the thermoplastic matrix or the thermosetting matrix includes polyamide.

12. The method of claim 9, wherein the fiber strands include carbon, aramid, glass, silicon carbide, or graphite.

13. The method of claim 9, wherein supplying the plurality of platelets into the injection molding machine includes metering the amount of the plurality of platelets introduced into the plasticizing cylinder.

14. The method of claim 9, including maintaining a pressure within the plasticizing cylinder below a threshold to reduce breakage of the fiber strands contained therein.

15. The method of claim 9, wherein the plurality of platelets are rectangular platelets having a surface area of between 0.005 in$^2$ and 0.5 in$^2$.

16. The method of claim 9, wherein the plurality of platelets include a mean thickness of less than 1 mm.

17. The method of claim 9, wherein the plurality of platelets include a mean length of between 1 mm and 4 mm.

* * * * *